US012566696B2

(12) United States Patent
Takemoto et al.

(10) Patent No.:  US 12,566,696 B2
(45) Date of Patent:  Mar. 3, 2026

(54) MEMORY SYSTEM THAT UPDATES ADDRESS MAPPING TABLE BASED ON WRITING OF COMPRESSED DATA

(71) Applicant: Kioxia Corporation, Tokyo (JP)

(72) Inventors: Takashi Takemoto, Yokohama Kanagawa (JP); Kensaku Yamaguchi, Kawasaki Kanagawa (JP); Keiri Nakanishi, Kawasaki Kanagawa (JP); Kohei Oikawa, Kawasaki Kanagawa (JP); Sho Kodama, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/593,215

(22) Filed: Mar. 1, 2024

(65) Prior Publication Data

US 2024/0303188 A1      Sep. 12, 2024

(30) Foreign Application Priority Data

Mar. 10, 2023      (JP) ................................. 2023-037805

(51) Int. Cl.
*G06F 12/02*      (2006.01)
(52) U.S. Cl.
CPC ...... *G06F 12/0246* (2013.01); *G06F 12/0253* (2013.01); *G06F 2212/7201* (2013.01)
(58) Field of Classification Search
CPC ............. G06F 12/0246; G06F 12/0253; G06F 2212/7201; G06F 2212/1016; G06F 2212/1044; G06F 2212/401; G06F 2212/7205; G06F 2212/7208
See application file for complete search history.

(56) References Cited

U.S. PATENT DOCUMENTS

| | | | |
|---|---|---|---|
| 9,898,404 B2 | 2/2018 | Huang et al. | |
| 10,013,170 B1 * | 7/2018 | Sahin | ..................... G06F 3/0631 |
| 10,120,793 B2 | 11/2018 | Kanno | |
| 10,635,310 B2 | 4/2020 | Kanno | |
| 2016/0110128 A1 * | 4/2016 | Tomlin | .................... G06F 3/065 |
| | | | 711/162 |

(Continued)

FOREIGN PATENT DOCUMENTS

| | | |
|---|---|---|
| JP | 6482322 B2 | 3/2019 |
| JP | 6553566 B2 | 7/2019 |

*Primary Examiner* — Tasnima Matin
(74) *Attorney, Agent, or Firm* — Kim & Stewart LLP

(57)      ABSTRACT

A memory system includes a nonvolatile memory and a controller. The controller is configured to maintain an address mapping table including first mapping information indicating correspondence between logical addresses and physical addresses of the nonvolatile memory in units of physical regions each having a predetermined size. The controller, during a write operation compresses write data of the predetermined size into a compressed write data, determines a physical address range in which the compressed write data is to be written, writes the compressed write data into the physical address range and also second mapping information into an area in one or more physical regions spanned by the physical address range, and updates the address mapping table. The second mapping information indicates a logical address of the write data, an information capable of specifying an offset, and a size of the compressed write data.

20 Claims, 13 Drawing Sheets

(56) References Cited

U.S. PATENT DOCUMENTS

| | | | |
|---|---|---|---|
| 2016/0313943 A1* | 10/2016 | Hashimoto | G06F 16/1847 |
| 2018/0088811 A1* | 3/2018 | Kanno | G06F 3/0604 |
| 2021/0073128 A1* | 3/2021 | Fukunaga | G06F 12/0866 |
| 2023/0142767 A1* | 5/2023 | Nakanishi | G06F 3/0631 |
| | | | 711/154 |

* cited by examiner

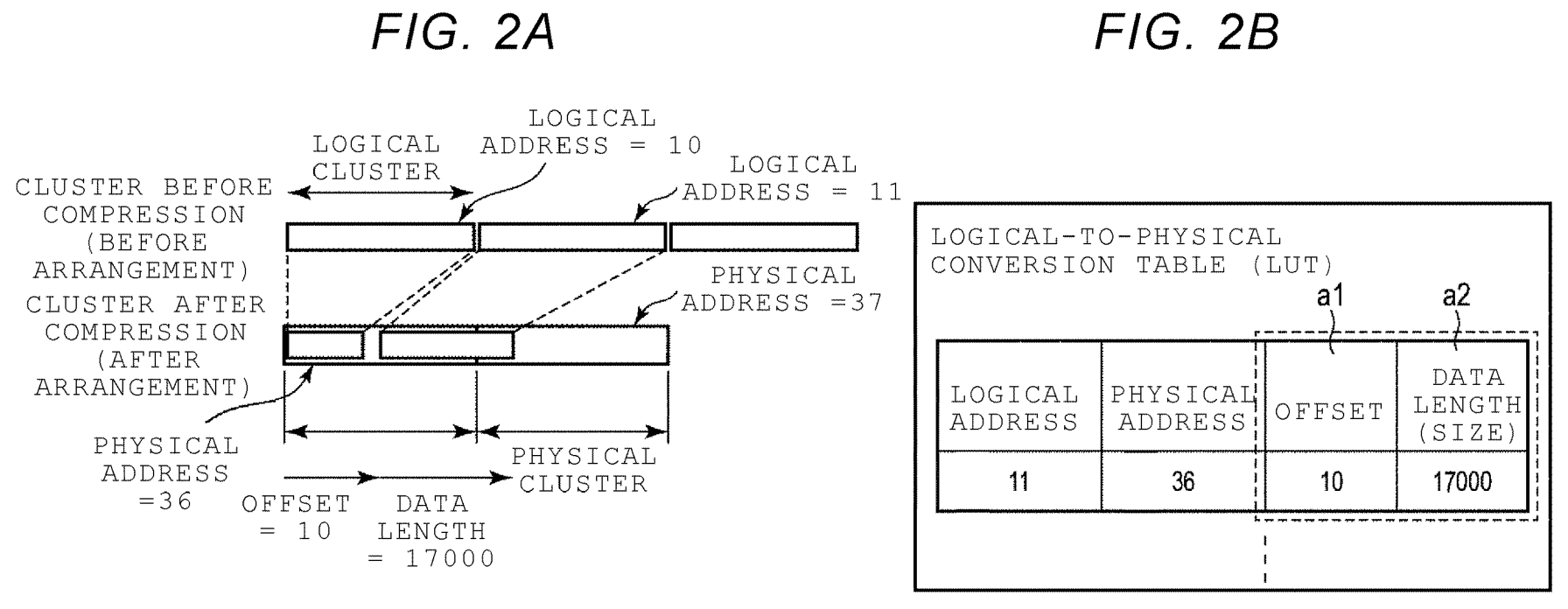

LOGICAL-TO-PHYSICAL
CONVERSION TABLE (LUT)

| LOGICAL<br>ADDRESS | PHYSICAL<br>ADDRESS | OFFSET | DATA<br>LENGTH<br>(SIZE) |
|---|---|---|---|
| 11 | 36 | 10 | 17000 | a1 a2

FIG. 2A

CLUSTER BEFORE
COMPRESSION
(BEFORE
ARRANGEMENT)

LOGICAL
CLUSTER

LOGICAL ADDRESS = 10

LOGICAL
ADDRESS = 11

CLUSTER AFTER
COMPRESSION
(AFTER
ARRANGEMENT)

PHYSICAL
ADDRESS = 37

PHYSICAL
CLUSTER

PHYSICAL
ADDRESS
=36

OFFSET
= 10

DATA
LENGTH
= 17000 b1

HEAD REGION (HEADER)

| LOGICAL ADDRESS | OFFSET | DATA LENGTH (SIZE) |
|---|---|---|
| 10 | 0 | 2500 |
| 11 | 10 | 17000 |

CLUSTER AFTER COMPRESSION (AFTER ARRANGEMENT)

PHYSICAL ADDRESS = 36

PHYSICAL CLUSTER

| LOGICAL ADDRESS | HEAD PHYSICAL ADDRESS | NUMBER OF READ CLUSTERS |
|---|---|---|
| 11 | 36 | 2 | b2

FIG. 4 a1 SELECT WITH NUMBER OF LOGICAL CLUSTERS a2 SELECT WITH PHYSICAL SIZE

FIG. 5

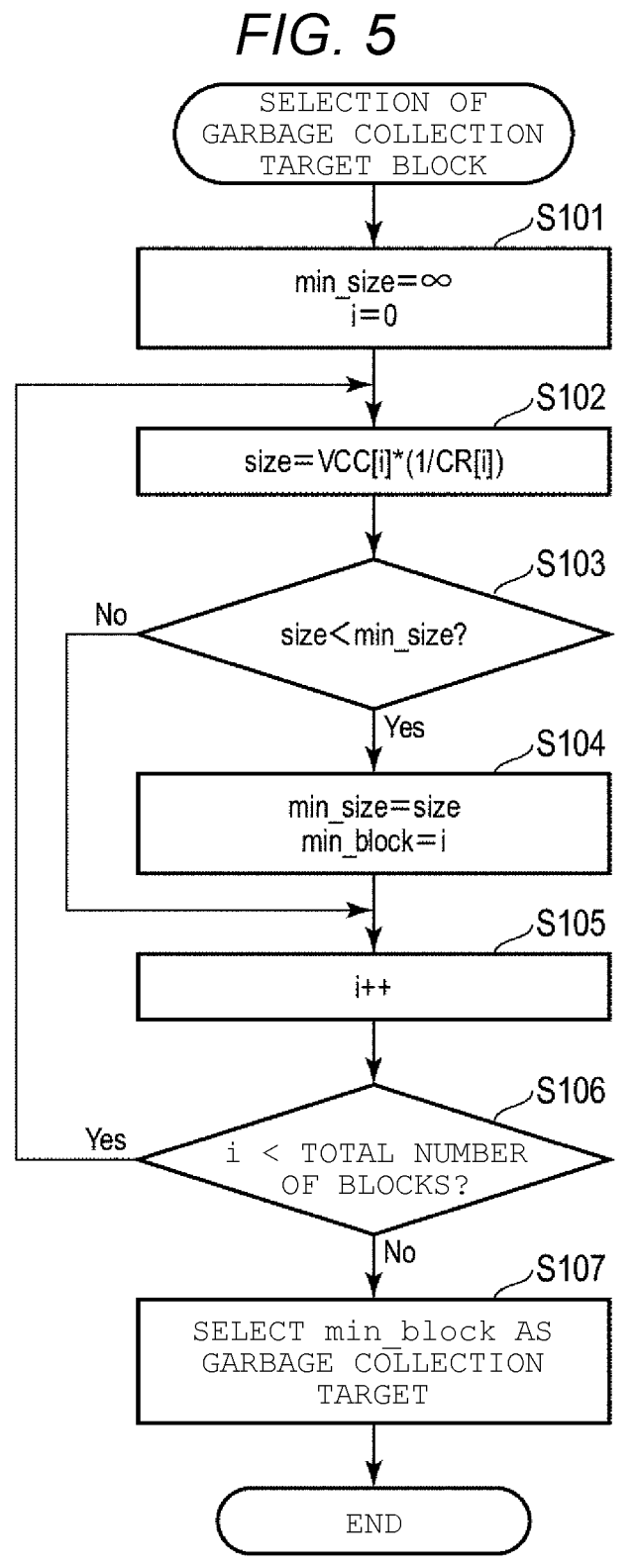

```
      ╭──────────────────────╮
      │   SELECTION OF        │
      │ GARBAGE COLLECTION    │
      │   TARGET BLOCK        │
      ╰──────────────────────╯
                │
                ▼                         S101
      ┌──────────────────────┐
      │    min_size=∞         │
      │       i=0             │
      └──────────────────────┘
                │
                ▼                         S102
      ┌──────────────────────┐
      │ size=VCC[i]*(1/CR[i]) │
      └──────────────────────┘
                │
                ▼                         S103
        No  ◇──────────────────◇
       ◀────│  size<min_size?   │
            ◇──────────────────◇
                │ Yes
                ▼                         S104
      ┌──────────────────────┐
      │    min_size=size      │
      │    min_block=i        │
      └──────────────────────┘
                │
                ▼                         S105
      ┌──────────────────────┐
      │        i++            │
      └──────────────────────┘
                │
                ▼                         S106
   Yes  ◇──────────────────────◇
  ◀─────│  i < TOTAL NUMBER     │
        │     OF BLOCKS?        │
        ◇──────────────────────◇
                │ No
                ▼                         S107
      ┌──────────────────────┐
      │ SELECT min_block AS   │
      │ GARBAGE COLLECTION    │
      │     TARGET            │
      └──────────────────────┘
                │
                ▼
      ╭──────────────────────╮
      │        END            │
      ╰──────────────────────╯
```

FIG. 6

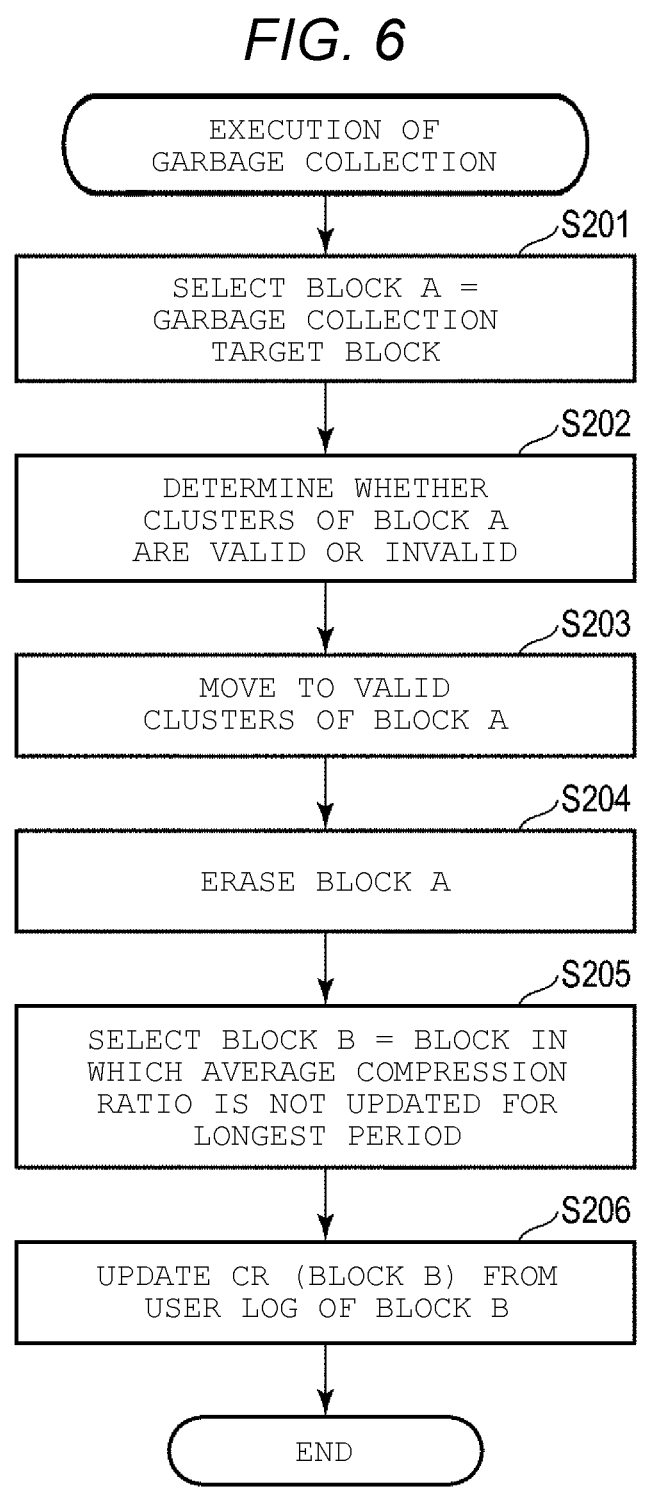

```
┌─────────────────────────────┐
│       EXECUTION OF          │
│    GARBAGE COLLECTION       │
└─────────────────────────────┘
              │
              ▼                    S201
┌─────────────────────────────┐
│       SELECT BLOCK A =      │
│     GARBAGE COLLECTION      │
│        TARGET BLOCK         │
└─────────────────────────────┘
              │
              ▼                    S202
┌─────────────────────────────┐
│      DETERMINE WHETHER      │
│     CLUSTERS OF BLOCK A     │
│     ARE VALID OR INVALID    │
└─────────────────────────────┘
              │
              ▼                    S203
┌─────────────────────────────┐
│        MOVE TO VALID        │
│      CLUSTERS OF BLOCK A    │
└─────────────────────────────┘
              │
              ▼                    S204
┌─────────────────────────────┐
│        ERASE BLOCK A        │
└─────────────────────────────┘
              │
              ▼                    S205
┌─────────────────────────────┐
│  SELECT BLOCK B = BLOCK IN  │
│ WHICH AVERAGE COMPRESSION   │
│  RATIO IS NOT UPDATED FOR   │
│       LONGEST PERIOD        │
└─────────────────────────────┘
              │
              ▼                    S206
┌─────────────────────────────┐
│   UPDATE CR (BLOCK B) FROM  │
│     USER LOG OF BLOCK B     │
└─────────────────────────────┘
              │
              ▼
┌─────────────────────────────┐
│            END              │
└─────────────────────────────┘
```

Figure 9:
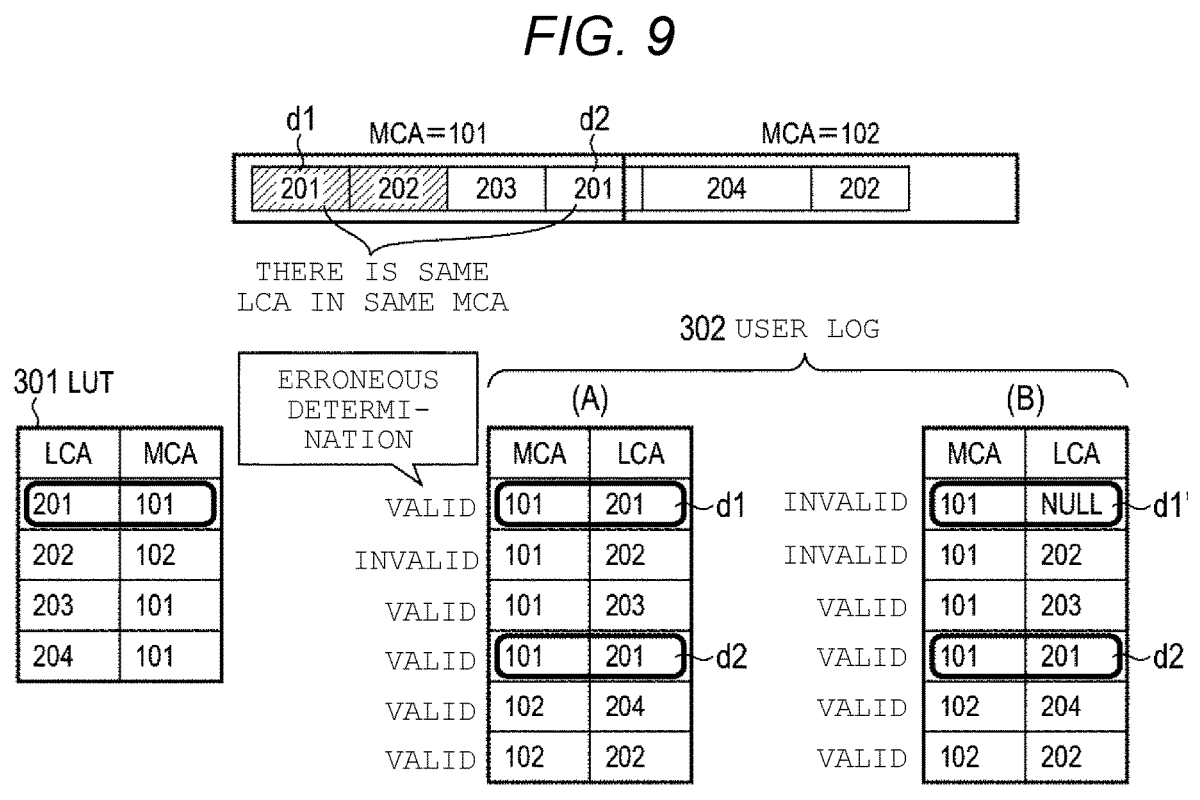

| LCA | MCA |
|-----|-----|
| 201 | 101 |
| 202 | 102 |
| 203 | 101 |
| 204 | 101 |

301 LUT

ERRONEOUS DETERMINATION

THERE IS SAME
LCA IN SAME MCA d1      MCA=101      d2      MCA=102

| 201 | 202 | 203 | 201 | 204 | 202 |

302 USER LOG (A)

| MCA | LCA |      |
|-----|-----|------|
| 101 | 201 | VALID → d1 |
| 101 | 202 | INVALID |
| 101 | 203 | VALID |
| 101 | 201 | VALID → d2 |
| 102 | 204 | VALID |
| 102 | 202 | VALID |

(B)

| MCA | LCA |      |
|-----|-----|------|
| 101 | NULL | INVALID → d1' |
| 101 | 202 | INVALID |
| 101 | 203 | VALID |
| 101 | 201 | VALID → d2 |
| 102 | 204 | VALID |
| 102 | 202 | VALID |

MEMORY SYSTEM THAT UPDATES ADDRESS MAPPING TABLE BASED ON WRITING OF COMPRESSED DATA

CROSS-REFERENCE TO RELATED APPLICATION (S)

This application is based upon and claims the benefit of priority from Japanese Patent Application No. 2023-037805, filed Mar. 10, 2023, the entire contents of which are incorporated herein by reference.

FIELD

Embodiments described herein relate generally to a memory system.

BACKGROUND

Memory systems such as solid state drives (SSDs) are widely used as a storage of information processing apparatuses such as servers or personal computers (PCs).

In recent years, there are needs to store massive amounts of data for data mining or the like in corporate activities, and therefore memory systems that have a function of compressing and decompressing data are becoming more prevalent.

In a case of an SSD including a NAND flash memory (also referred to as NAND memory), a controller controlling the NAND memory manages a table which is used for a host (e.g., information processing apparatus) to designate a storage location of data when issuing a write command or a read command and which stores a correspondent relation between a logical address logically indicating a position on the NAND memory and a physical address indicating a physical position on the NAND memory. The table is referred to as a logical-to-physical address conversion table, an address mapping table, a lookup table (LUT), or the like. The controller caches and uses a necessary portion of the logical-to-physical address conversion table in a dynamic random access memory (RAM) (DRAM) or the like.

BRIEF DESCRIPTION OF THE DRAWINGS

FIG. 1 is a diagram illustrating a configuration example of a memory system according to a first embodiment;

FIGS. 2A and 2B are diagrams illustrating a function of compressing and decompressing data according to a comparative example;

FIG. 4 is a diagram illustrating an example of evaluating a WAF when a garbage collection target block is selected with the number of logical clusters and when the garbage collection target block is selected with a physical size;

FIG. 5 is a flowchart illustrating selection of the garbage collection target block in the memory system according to the first embodiment;

FIG. 6 is a flowchart illustrating updating of an average compression ratio of a block in the memory system according to the first embodiment;

FIG. 7 is a diagram illustrating an advantage of periodically updating the average compression ratio of the block in the memory system according to the first embodiment;

FIG. 8 is a diagram illustrating a case in which there is a possibility of erroneously determining at which position data of a purpose logical cluster is located in the physical cluster;

FIG. 9 is a diagram illustrating an operation of preventing erroneous determination in cluster validity/invalidity determination by a memory system according to a second embodiment;

DETAILED DESCRIPTION

Figures 3A, 3B:
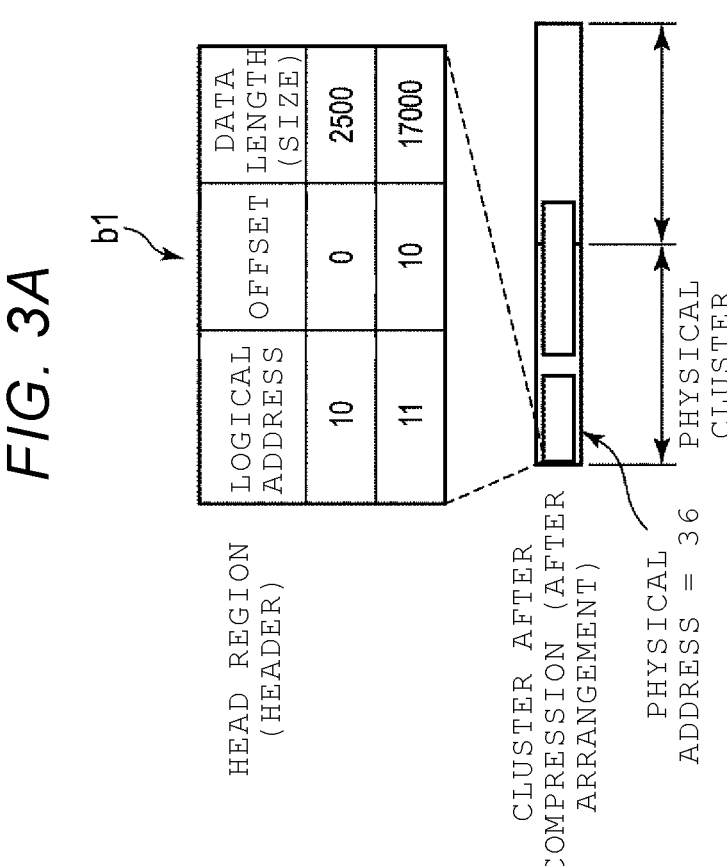
FIGS. 3A and 3B are diagrams illustrating an example of a configuration of a logical-to-physical address conversion table (LUT) and arrangement of data in a physical cluster of a NAND memory in the memory system according to the first embodiment.

Embodiments provide a memory system capable of improving I/O (input/output) performance.

In general, according to an embodiment, A memory system includes a nonvolatile memory and a controller. The controller is configured to maintain an address mapping table including first mapping information indicating correspondence between logical addresses and physical addresses of the nonvolatile memory in units of physical regions each having a predetermined size, and perform a write operation in response to a write command. The controller, during the write operation compresses write data of the predetermined size corresponding to the write command into a compressed write data, determines a physical address range of the nonvolatile memory in which the compressed write data is to be written, writes the compressed write data into the physical address range of the nonvolatile memory and also second mapping information into an area in one or more physical regions spanned by the physical address range, and updates the address mapping table, such that the first mapping information corresponding to the write data indicates that the logical address of the write data is mapped to one of the one or more physical regions. The second mapping information includes a first entry that indicates a logical address of the write data, an information capable of specifying an offset, and a size of the compressed write data. The offset indicates a starting point of the physical address range from which the compressed write data is written.

Hereinafter, embodiments will be described with reference to the drawings.

First Embodiment

First, a first embodiment will be described.

Figure 1:
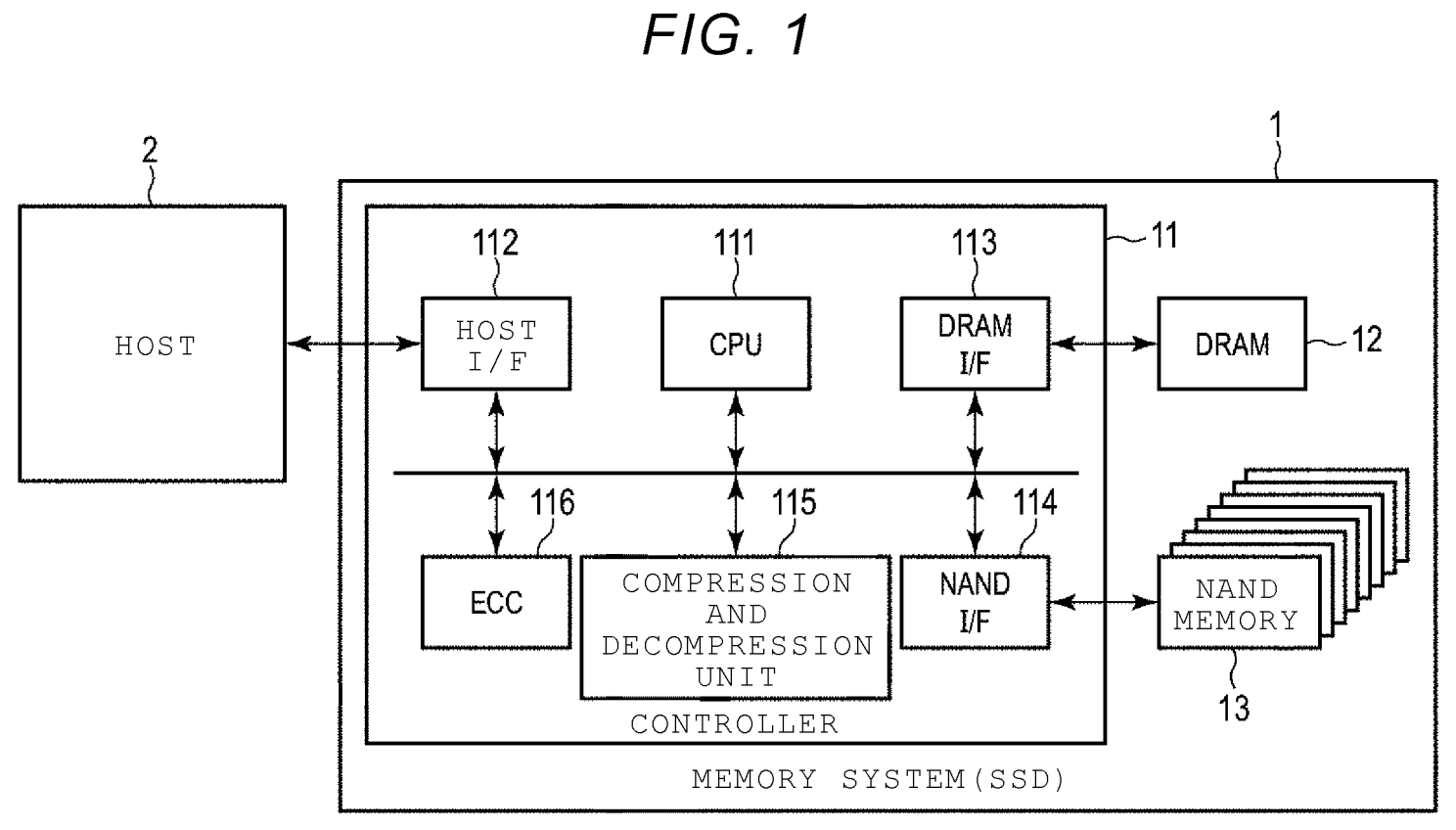

FIG. 1 is a diagram illustrating a configuration example of a memory system 1 according to a first embodiment. FIG. 1 illustrates a configuration example of an information processing system including the memory system 1 and a host 2 to which the memory system 1 is connected as a storage. The host 2 is an information processing apparatus such as a server or a PC.

The memory system 1 includes a controller 11, a DRAM 12, and a NAND flash memory (NAND memory) 13. Here, an example in which the memory system 1 is implemented as an SSD (Solid State Drive) will be described. The memory system 1 is not limited to an SSD, and various nonvolatile memories can be mounted instead of the NAND memory 13. Here, an example in which the DRAM (Dynamic Random Access Memory) 12 is mounted as a work area of the controller 11 in the memory system 1 will be described. Instead of mounting the DRAM 12, for example, a static RAM (SRAM) may be built in the controller 11 or may be added.

The controller 11 is in charge of controlling operations of the memory system 1. The controller 11 includes a central processing unit (CPU) 111, a host interface 112, a DRAM interface 113, a NAND interface 114, a compression and decompression unit 115, and an error check and correct (ECC) 116.

The CPU 111 implements various processes that are executed by the controller 11 by executing a control program (e.g., firmware). The various processes that are executed by the controller 11 include a write process of writing data in the NAND memory 13 in response to a write command from the host 2 and a read process of reading data stored in the NAND memory 13 in response to a read command from the host 2. Here, an example in which the various processes that are executed by the controller 11 are implemented by the CPU 11 executing firmware will be described. However, the various processes be implemented by dedicated hardware built in the controller 11.

The host interface 112 controls communication in conformity with a predetermined communication standard with the host 2. The DRAM interface 113 controls writing of data in the DRAM 12 and reading of data from the DRAM 12. The NAND interface 114 controls writing of data in the NAND memory 13 and reading of data from the NAND memory 13.

The compression and decompression unit 115 compresses write data requested to be written in the NAND memory 13 with a write command to generate compressed data or decompresses compressed data corresponding to read data requested to be read from the NAND memory 13 with a read command to acquire the read data. That is, the memory system 1 according to the first embodiment has a function of compressing and decompressing data.

The ECC 116 executes an error correction process on the compressed data generated by the compression and decompression unit 115. Specifically, when a write command is received, the ECC 116 generates an error correction code for detecting and correcting an error just in case that, in the future, the error occurs in compressed data that has been written in the NAND memory 13. When a read command is received, the ECC 116 determines whether an error occurs in compressed data read from the NAND memory 13 using the error correction code and corrects the error if the error is detected.

For example, when a write command is issued from the host 2, the write command is received by the host interface 112. When the write command is received, the CPU 111 receives the write data via the host interface 112 and temporarily stores the write data in the DRAM 12 via the DRAM interface 113.

The CPU 111 supplies the write data in the DRAM 12 to the compression and decompression unit 115 and instructs the compression and decompression unit 115 to compress the write data. When the compressed data is generated by the compression and decompression unit 115, the CPU 111 supplies the compressed data to the ECC 116 and instruct the ECC 116 to generate an error correction code. The CPU 111 attaches the error correction code generated by the ECC 116 to the compressed data and stores the compressed data to which the error correction code is attached in the NAND memory 13 via the NAND interface 114.

For example, when a read command is issued from the host 2, the read command is received by the host interface 112. When the read command is received, the CPU 111 reads the compressed data corresponding to the read data designated with the read command from the NAND memory 13 via the NAND interface 114. The CPU 111 temporarily stores the compressed data read from the NAND memory 13 in the DRAM 12 via the DRAM interface 113. An error correction code generated during writing in the NAND memory 13 is affixed to the compressed data.

The CPU 111 supplies the compressed data in the DRAM 12 to the ECC 116 and instructs the ECC 116 to detect and correct an error that is likely to occur in the compressed data using the error correction code. The CPU 111 supplies the compressed data subjected to the error detection and correction by the ECC 116 to the compression and decompression unit 115 and instructs the compression and decompression unit 115 to decompress the compressed data. The CPU 111 transmits the read data acquired by decompressing the compressed data by the compression and decompression unit 115 to the host 2 via the host interface 112.

The write command or the read command issued from the host 2 includes a logical address designating a data storage location. The logical address is an address indicating a position in a logical address space of the memory system 1 supplied to the host 2. In other words, the logical address is an address logically indicating a position on the NAND memory 13.

Meanwhile, the CPU 111 executes writing of data in the NAND memory 13 via the NAND interface 114 and reading of data from the NAND memory 13 by using a physical address indicating a position in a physical address space where mapping to the logical address space is dynamically executed. The physical address indicates a physical position on the NAND memory 13.

Therefore, it is necessary for the CPU 111 to execute address conversion to convert a logical address into a physical address. The address conversion is also referred to as address resolution or the like. For the address conversion, the CPU 111 manages a table that stores a correspondent relation between a logical address and a physical address. This table is referred to as a logical-to-physical address conversion table, an address mapping table, an LUT, or the like. The CPU 111 stores the logical-to-physical address conversion table in the NAND memory 13, and caches and uses a predetermined portion of the logical-to-physical address conversion table stored in the DRAM 12.

A logical address and a physical address are respectively allocated to a logical region with predetermined size in the logical address space and a physical region with a predetermined size in the physical address space. The logical region with the predetermined size is referred to as a logical cluster or the like, and the physical region with the predetermined size is referred to as a physical cluster or the like. By managing the logical-to-physical address conversion table that stores a correspondent relation between logical addresses and physical addresses, the memory system 1 can dynamically associate a logical cluster and a physical cluster. The predetermined size is a unit in which the host 2 manages data on the memory system 1. The host 2 sets data with a size of an integral multiple of the predetermined size as a target and requests the memory system 1 to write or read the data.

On the other hand, the memory system 1 can write data in the NAND memory 13 or can read data from the NAND memory 13 in units of pages which is finer in granularity than the physical cluster. The memory system 1 erases data on the NAND memory 13 in units of blocks including a plurality of physical clusters. A block in which data has been erased is referred to as a free block or the like. The memory system 1 allocates a free block and writes data in a physical cluster of the free block, and allocates a new free block when data is written in all physical clusters.

The NAND memory 13 is a nonvolatile storage medium in which data cannot be overwritten in a region where data is written. Data is updated by invalidating original data stored in a certain region and writing new data in another region. Therefore, a block or the like in which data of most of the regions is invalidated is likely to occur over time. Accordingly, the CPU 111 periodically or sequentially executes a process of moving valid data in such a block and generating a free block. The process of generating the free block is referred to as garbage collection or the like.

For example, when write data is written in the NAND memory 13, the host 2 designates a logical address and a data length with a write command and transmits write data with the data length to the memory system 1. When data is not compressed, the number of logical clusters in the logical address space and the number of physical clusters in the physical address space that are used for the write data match each other. That is, the logical clusters and the physical clusters correspond by one-to-one relationship. Accordingly, when data is not compressed, a physical address associated with each logical address may be stored in each entry corresponding to the number of logical addresses in the logical-to-physical address conversion table.

In contrast, when data is compressed, the number of logical clusters in the logical address space that is used for write data and the number of physical clusters in the physical address space that is used for compressed data generated by compressing the write data do not match each other. A case in which compressed data of data of two or more logical clusters coexists in one physical cluster can also occur. Accordingly, when data is compressed, information or the like for extracting compressed data corresponding to data of a logical cluster indicated with a logical address from compressed data stored in the physical cluster indicated with a physical address is required to be further stored in the logical-to-physical address conversion table in addition to the physical address in each of entries corresponding to the number of logical addresses.

Here, a memory system that has a function of compressing and decompressing data according to a comparative example will be described with reference to FIGS. 2A and 2B.

FIG. 2A illustrates an example in which the memory system according to the comparative example compresses data received from a host and writes the compressed data in the NAND memory. FIG. 2B illustrates an example of various pieces of information included in a logical-to-physical address conversion table by the memory system according to the comparative example.

For example, it is assumed that the memory system according stores to the comparative example compressed data corresponding to data of a logical cluster indicated with logical address "10" up to the middle of a physical cluster indicated with physical address "36". Here, in the physical cluster, it is assumed that management is executed in units of sub-pages obtained by dividing the physical cluster into 16 pieces and ten sub-pages are used among the sixteen sub-pages (0 to 15). That is, it is assumed that termination of the compressed data is located in sub-page 9.

Next, it is assumed that the memory system according to the comparative example stores compressed data corresponding to data of a logical cluster indicated with logical address "11" from the middle of the physical cluster indicated with physical address "36" subsequently to the compressed data stored immediately previously and corresponding to the data of the logical cluster indicated with the logical address "10". More specifically, it is assumed that the compressed data is stored from sub-page 10. It is assumed that the compressed data is not entered in the remaining six sub-pages and is stored over two physical clusters. The physical cluster indicated with physical address "36" and the physical cluster indicated with physical address "37" are physical clusters provided in the same block. It is assumed that a data length of the compressed data is 17000 bytes. While the data length of the data before compression is constant for the logical cluster, the data length varies depending on content of the data before compression.

The memory system according to the comparative example stores offset information (a1) indicating sub-page 10 among the sixteen sub-pages and a data length (a2) in addition to the physical address "36" in an entry corresponding to the logical address "11" among all the entries of the logical-to-physical address conversion table, as illustrated in FIG. 2B, with regard to the compressed data corresponding to the data of the logical cluster indicated with logical address "11".

By additionally storing the offset information (a1) and the data length (a2) in the logical-to-physical address conversion table, the memory system according to the comparative example can acquire the compressed data left justified and stored in the physical cluster without excess or deficiency. Specifically, for example, in the case of the compressed data corresponding to the data of the logical cluster indicated with the logical address "11", the memory system according to the comparative example may read data corresponding to 17000 bytes from sub-page 10 of the physical cluster indicated with physical address "36" based on the logical-to-physical address conversion table.

In the memory system according to the comparative example, however, when offset information is stored with 4 bits and the data length is stored with 16 bits in the logical-to-physical address conversion table, 20 bits increase for one entry in the logical-to-physical address conversion table. When it is assumed that a physical address is stored with 28 bits, 20 bits increases from 28 bits to 48 (28+4+16) bits. Therefore, an increase ratio reaches 71.4%.

In the logical-to-physical address conversion table, a necessary portion is cached and used in a DRAM or the like. No problem occurs when a capacity of a cache region increases with an increase in the logical-to-physical address conversion table. However, when the capacity of the cache region cannot increase in terms of cost or the like, a cache hit ratio of the logical-to-physical address conversion table decreases. That is, the decrease in the cache hit ratio of the logical-to-physical address conversion table results in deterioration in I/O performance of the memory system.

When the function of compressing and decompressing data is operated, the memory system 1 according to the first embodiment is directed to improving the I/O performance because a cache hit ratio of the logical-to-physical address conversion table is improved while further inhibiting an increase in the size of the logical-to-physical address conversion table than the memory system according to the comparative example and inhibiting an increase in the capacity of the cache region of the logical-to-physical address conversion table. Hereinafter, this point will be described in detail.

FIGS. 3A and 3B are diagrams illustrating an example of a configuration of a logical-to-physical address conversion table (LUT) and arrangement of data in a physical cluster of the NAND memory 13 in the memory system 1 according to the first embodiment.

FIG. 3A illustrates an example in which compressed data corresponding to the data of the logical cluster indicated with the logical address "11" is stored in the physical cluster indicated with physical address "36" subsequently to the compressed data corresponding to data of the logical cluster indicated with the logical address "10" as in the case of the above-described memory system according to the comparative example.

In the memory system 1 according to the first embodiment, the CPU 111 performing address conversion (address resolution) to convert a logical address into a physical address stores the offset information and the data length of the compressed data, which is stored in the logical-to-physical address conversion table in the memory system according to the comparative example, in a head region (header or header area) of the physical cluster (b1). Here, an example in which a region where such information is stored is provided in the head of the physical cluster will be described. However, the position may be a position other than the head of the physical cluster.

FIG. 3B illustrates an example of various pieces of information stored in the logical-to-physical address conversion table in association writing of data illustrated in FIG. 3A. The CPU 111 storing the offset information and the data length of the compressed data not in the logical-to-physical address conversion table but in the physical cluster stores the number of physical clusters of a plurality of physical clusters in which the compressed data is arranged as the number of read clusters (b2) in the logical-to-physical address conversion table when the compressed data spans the plurality of physical clusters. For example, since the compressed data corresponding to the data of the logical cluster indicated with the logical address "11" spans two physical clusters, the CPU 111 stores the number of read clusters "2" in the entry corresponding to the logical address "11" among the entries of the logical-to-physical address conversion table in addition to head physical address "36".

When the compressed data corresponding to the data of the logical cluster indicated with logical address "11" is read from the NAND memory 13, the CPU 111 first reads all data of the two physical clusters including the compressed data based on the physical address "36" and the number of read clusters "2" stored in the logical-to-physical address conversion table. Subsequently, based on the offset information and the data length of the compressed data stored in the head region of the physical cluster indicated with the physical address "36", the CPU 111 extracts the compressed data corresponding to the data of the logical cluster indicated with the logical address "11" among the read data of the two physical clusters.

Since a bit string indicating the number of read clusters (b2) of the logical-to-physical address conversion table is sufficiently less than a bit string indicating the offset information and the data length, an increase in the size of the logical-to-physical address conversion table can be inhibited to a slight level. Therefore, an influence on a cache hit ratio is small.

That is, when operating the function of compressing and decompressing data, the memory system 1 according to the first embodiment can improve the I/O performance because a cache hit ratio of the logical-to-physical address conversion table is improved while inhibiting an increase in the size of the logical-to-physical address conversion table and inhibiting an increase in the capacity of the cache region of the logical-to-physical address conversion table.

In a specific implementation, in the memory system 1 according to the first embodiment, in order to inhibit an increase in the size of the logical-to-physical address conversion table, the data length of the compressed data corresponding to the data of the logical cluster is not stored in the logical-to-physical address conversion table. When there is no information regarding a physical size in the logical-to-physical address conversion table, it is difficult to ascertain valid physical data size of each block. This is because when a cluster of a certain logical address is overwritten and a physical size of the overwritten cluster is not known, information regarding a valid physical data size of a block to which the cluster belongs cannot be updated. Reading of a header of a data body only for updating the data size information is not realistic from the viewpoint of performance.

Normally, the information regarding the valid physical data size is required for selection of a garbage collection target block. By setting a block in which valid data is the smallest in size as a garbage collection target block, it is possible to reduce a write application factor (WAF). The WAF is an index of writing efficiency indicated by a ratio of an amount of data actually written in the NAND memory 13 to an amount of data required to be written from the host 2. When there is no information regarding the valid physical data size, a garbage collection target block is selected instead with the number of valid logical clusters. In this case, an optimum block may not be selected, the WAF tends to deteriorate.

Figure 4:
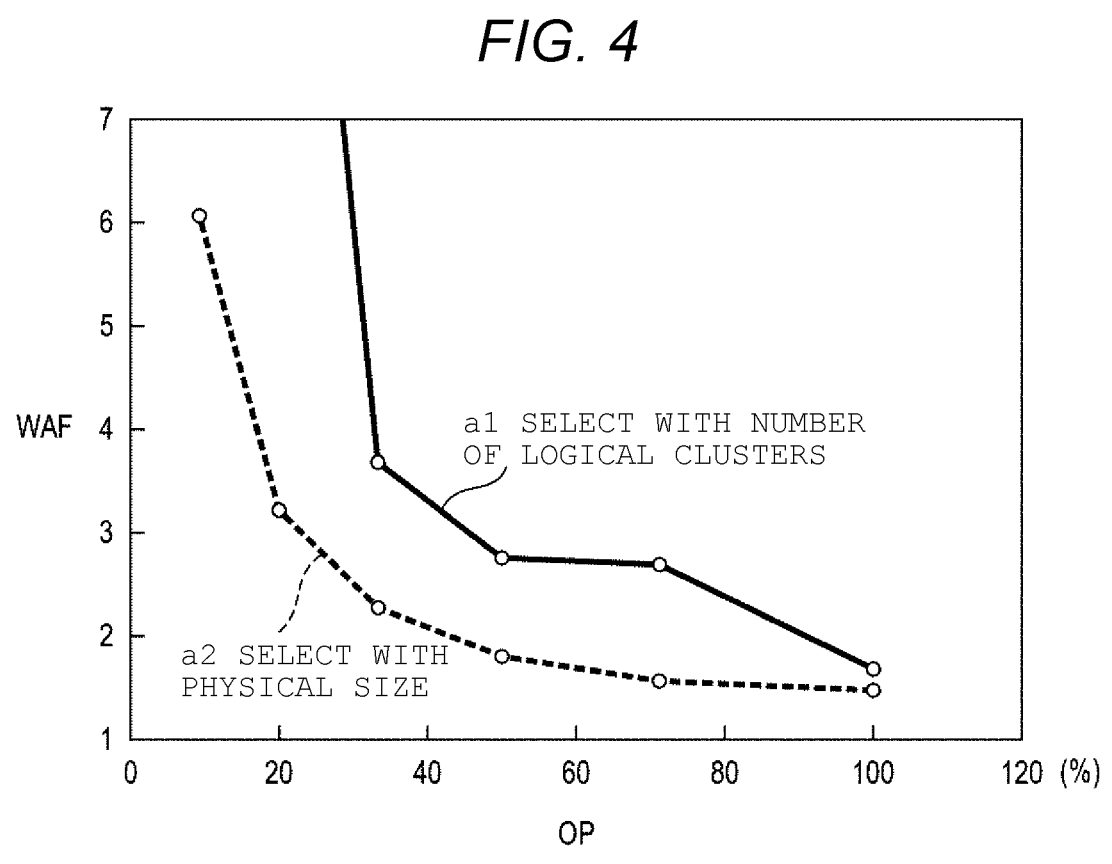

FIG. 4 is a diagram illustrating an example of evaluating a WAF when a garbage collection target block is selected with the number of logical clusters and when the garbage collection target block is selected with a physical size.

In this example, there is a deviation in a compression ratio distribution depending on blocks, a large difference occurs in the result between the case (a1) of the selection with the number of logical clusters and the case (a2) of the selection with the physical size. The WAF is twice at over provisioning (OP)=40% and the difference is larger at the OP=20%. The OP is a ratio of a storage capacity owned as an excess by the memory system 1 with respect to a storage capacity provided to the host 2. In this way, when there is a deviation in the compression ratio distribution, the WAF considerably deteriorates.

To address such an issue, in a specific implementation, the memory system 1 according to the first embodiment has a function of estimating a valid physical size from the number of valid logical clusters using an average compression ratio of a block and further periodically updating the average compression ratio of the block to select an appropriate garbage collection target block. Hereinafter, this point will be described in detail. The number of valid logical clusters of each block and the average compression ratio of each block are managed as, for example, a table.

Write target user data is transmitted from the host interface 112 to the controller 11 and is divided in units of logical clusters. Thereafter, each logical cluster is compressed by the compression and decompression unit 115 to become a compressed cluster with a variable length size. The compressed cluster is partitioned in units of ECC frames (synonymous with physical clusters) with a fixed length to be written in the NAND memory 13. The controller 11 collects thousands to tens of thousands of physical clusters to configure a block. Garbage collection (GC) is executed in units of blocks.

FIG. 5 is an example of a flowchart illustrating selection of the garbage collection target block in the memory system according to the first embodiment.

An operation of selecting a garbage collection target block in the memory system 1 according to the first embodiment is basically an operation of finding a block with a minimum evaluation value (size). Here, the evaluation value is a value obtained by multiplying the number of valid logical clusters (VCC [i]) in a block by a reciprocal of an average compression ratio (CR [i]) of the block. The average compression ratio of a block is a value obtained by dividing a total data amount of valid logical clusters in a block by a total data amount of valid physical data in the block.

The controller 11 first initializes a minimum value (min_size) of the evaluation value and a value of a counter (i) for sequentially setting each block as an inspection target (S101). Here, min_size is set to an infinite value (high-value) and i is set to 0. A unique value (natural number) is allocated to each block in an ascending order from 0.

The controller 11 obtains an evaluation value of an inspection target block (S102). The controller 11 compares the evaluation value (size) obtained in S102 with the previous minimum value (min_size) (S103). When the evaluation value is a smaller value (Yes in S103), the minimum value (min_size) is updated to the evaluation value (size) and a value of a counter (min_block) indicating a block with the minimum evaluation value is updated to the value of the counter (i) indicating a block with the evaluation value (size), which is an inspection target at that time (S104).

When the evaluation value (size) obtained in S102 is equal to or greater than the previous minimum value (min_size) (No in S103), the controller 11 skips the process of S104. The controller 11 increases the value of the counter (i) (S105) and compares the value of the counter (i) with a total number of blocks (S106).

When the value of the counter (i) is less than the total number of blocks (Yes in S106), the controller 11 repeats the process from S102 on a block which is indicated with the increased counter (i) and newly becomes an inspection target. That is, in a loop from S102 to S106, an operation in which the evaluation value (size) is obtained for each block and is compared with the previous minimum value (min_size), and the minimum value (min_size) is updated to the evaluation value (size) when the evaluation value is less.

When the value of the counter (i) reaches the total number of blocks (No in S106), the controller 11 sets a block indicated with the counter (min_block) as a garbage collection target (S107).

Accordingly, in the memory system 1 according to the first embodiment, a block is selected with the evaluation value in which the magnitude of actual valid data amount is reflected rather than selecting the block simply using the number of logical clusters as the evaluation value. Therefore, efficiency of the garbage collection is improved and the WAF is ameliorated.

In the memory system 1 according to the first embodiment, by periodically updating the average compression ratio (CR [i]) of the block, it is possible to further improve the efficiency of the garbage collection and further ameliorate the WAF.

In the memory system 1 according to the first embodiment, the average compression ratio of the block in completion of writing in the block is calculated and is updated in a range in which there is no influence on the performance even after the completion of the writing in the block.

FIG. 6 is an example of a flowchart illustrating updating of an average compression ratio of a block in the memory system 1 according to the first embodiment. Here, an example in which whenever one garbage collection target block is selected, one block is selected apart from that and an average compression ratio is updated will be described. In FIG. 6, Block A is a garbage collection target block and Block B is a block for which the average compression ratio is updated. A selection rule for Block B is that a block for which the average compression ratio has not been updated for a longest period is selected. A timing at which the average compression ratio is updated is not limited thereto and may be, for example, a time at which a block in which the number of logical clusters invalidated from the previous updating of the average compression ratio exceeds a given number is generated. A selection rule of Block B is not limited thereto either and may be that the number of logical cluster invalidated from the previous updating timing of the average compression ratio is the largest, for example.

The controller 11 sets Block A as a garbage collection target block (S201) and determines whether all the clusters of Block A are valid or invalid (S202). The controller 11 moves the valid clusters of the Block A (S203). More specifically, the controller 11 stores data of the valid clusters in the clusters of a block which is a write target at that time. When the movement of the valid clusters is completed, the controller 11 erases the Block A, that is, the garbage collection target block (S204).

Subsequently, the controller 11 selects Block B as a block for which the average compression ratio has not been updated for the longest period (S205) and updates the average compression ratio (CR [Block B]) of the Block B using a user log of the Block B. The user log is a log that stores a history of writing of data for each block. The user log chronologically accumulates, for example, sets including logical addresses and physical address of write data.

Figures 7, 8:
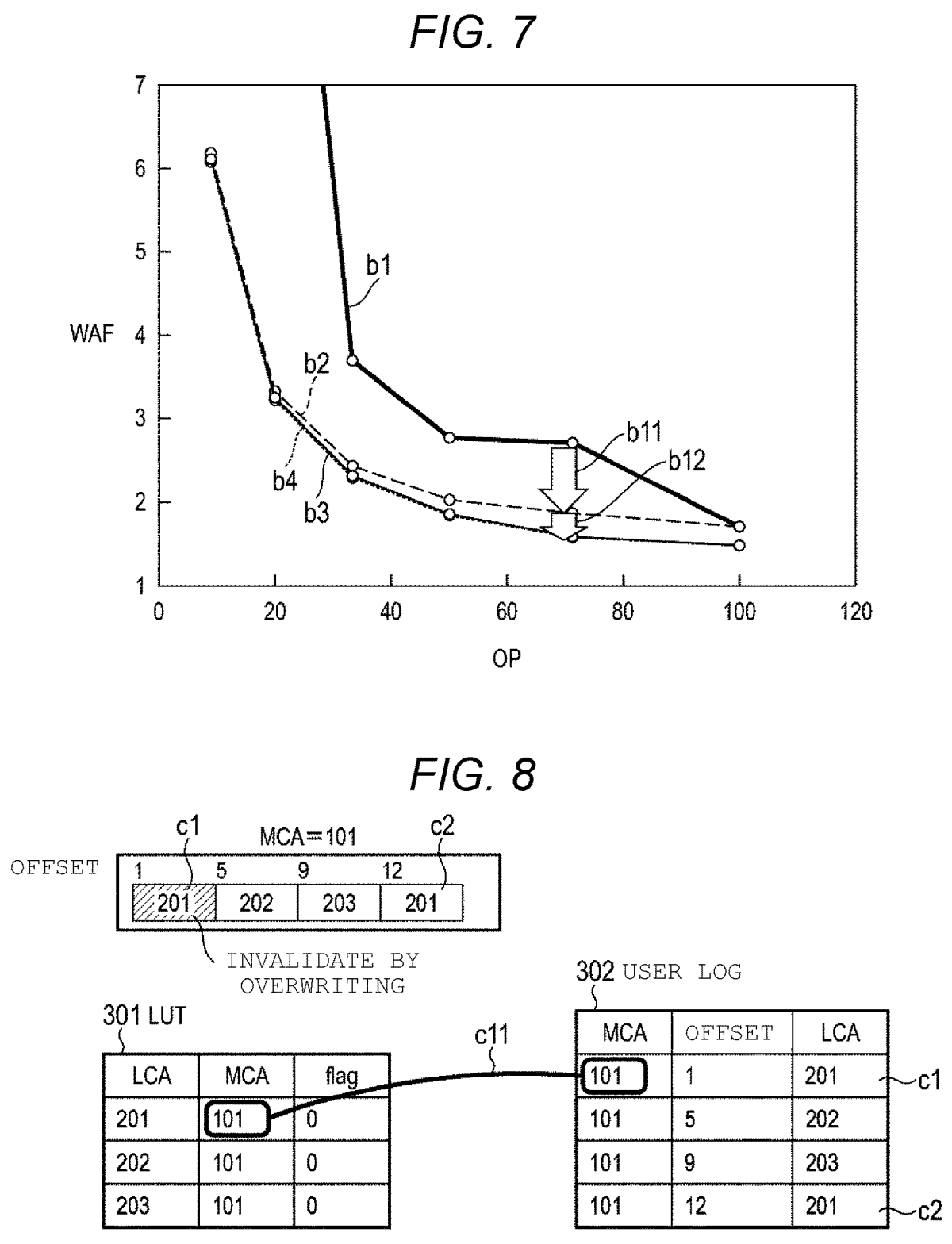

FIG. 7 is a diagram illustrating an advantage of the memory system 1 according to the first embodiment.

In FIG. 7, a graph denoted by reference numeral b1 is a graph corresponding to a1 of FIG. 4 when the evaluation value is set to the number of logical clusters. A graph denoted by reference numeral b2 is a graph when the evaluation value is set to a product of the number of valid logical clusters and a reciprocal of the average compression ratio of the block. Further, a graph denoted by reference numeral b3 is a graph when the average compression ratio of another block is updated whenever one garbage collection target block is selected. A graph denoted by reference numeral b4 is a graph corresponding to a2 of FIG. 4 when the evaluation value is set to an actual valid data size (physical data size).

As understood from FIG. 7, in the memory system 1 according to the first embodiment, the WAF can be considerably ameliorated by estimating the valid physical size from the number of valid logical clusters using the average compression ratio of the block (b11). In the memory system 1 according to the first embodiment, the average compression ratio can be substantially matched with an ideal ratio by periodically updating the average compression ratio of the block, and thus the WAF can be further ameliorated (b12).

As described above, in the memory system 1 according to the first embodiment, it is possible to improve I/O performance.

Second Embodiment

Next, a second embodiment will be described. In description of the second embodiment, a memory system that has the same configuration as the configuration of the first embodiment will be described as an example, and the same reference numerals are used for the same components.

In description of a memory system according to the second embodiment, a feature for solving a problem that there is a possibility of erroneous determination of a position at which data of a read target logical cluster is located in a physical cluster when the data of the logical cluster is read from the NAND memory 13 will be mainly described.

First, a case where there is a possibility of erroneous determination of a position at which data of an access target logical cluster is located in a physical cluster will be described with reference to FIG. 8.

In a header of an ECC frame, a table indicating correspondence between a logical address and an offset is stored. As described above, the ECC frame is synonymous with a physical cluster. In FIG. 8, a logical address is notated as a logical cluster address (LCA) and a physical address is notated as a media cluster address (MCA). Hereinafter, similar notation is used for a logical address and a physical address in some cases.

The controller 11 acquires an offset of data of each logical cluster in the table stored in the header of the ECC frame. However, when there are a plurality of same logical addresses, the number of corresponding offsets is plural. Thus, the controller 11 cannot determine a position of an offset from which data is to be read.

The example of FIG. 8 shows that data of a logical cluster with a logical address 201 is first written (c1) in a physical cluster with a physical address 101, and data of the logical cluster with the logical address 201 is subsequently written again (c2) after data of logical clusters of logical addresses 202 and 203 is written. The data of the logical cluster with the logical address 201 is overwritten and the first written data (c1) is invalidated by the second written data (c2).

The controller 11 determines whether the written data is valid or invalid with reference to a logical-to-physical address conversion table (LUT) 301 in each entry of the user log 302 that stores a set including a physical address and a logical address (C11). Specifically, matching or non-matching with a set including a logical address and a physical address stored in the logical-to-physical address conversion table is determined. Here, an example in which a set including a physical address and a logical address is stored in a user log 302 will be described, but an embodiment is not limited thereto. For example, only a logical address may be stored in the user log 302 and a physical address may be obtained through calculation using the logical address.

Here, since the data (c1) of the logical cluster with logical address 201 written in the physical cluster with the physical address 101 is updated by writing new data (c2) in the physical cluster with the same physical address 101, the logical-to-physical address conversion table does not appear to needs update. That is, the logical address 201 remains to be associated with the physical address 101 on the logical-to-physical address conversion table similarly to before the updating of the data.

For that reason, the controller 11 is likely to erroneously determine as valid since the set including the logical address and the physical address in the user log matches the set including the logical address and the physical address in the logical-to-physical address conversion table when the controller 11 determines whether the data (c1) of the logical cluster with the logical address 201 first written in the physical cluster with the physical address 101 is valid or invalid. As a result, as data of the logical cluster with the logical address 201, the data (c2) should be obtained by extracting compressed data from the offset 12 of the physical cluster with the physical address 101, but the data (c1) is likely to be obtained by extracting the compressed data from the offset 1. When updated data is written in a physical cluster different from a physical cluster in which data before updated is stored, the logical-to-physical address conversion table is updated. Therefore, such a problem does not occur.

Based on this viewpoint, a feature in which data before update is not erroneously determined to be valid even when updated data is written in the same physical cluster in which data before update is stored in the memory system 1 according to the second embodiment will be described.

When a log cluster is written in the NAND memory 13, the controller 11 in the memory system 1 according to the second embodiment invalidates entries other than the rearmost (e.g., newest) entry when there are the entries with the same logical address within a range of the same physical address. The log cluster is data in which user logs are collected in a size of a unit of writing in the NAND memory 13. The user logs are usually collected in a size of a physical cluster and are written in the NAND memory 13.

That is, in the memory system 1 according to the second embodiment, the controller 11 invalidates the entries other than the rearmost entry at a timing at which a given number of user logs are accumulated and become nonvolatile when there are the entries with the same logical address within the range of the same physical address, so that erroneous determination is prevented in the cluster validity/invalidity determination.

An operation of preventing erroneous determination in the cluster validity/invalidity determination by the controller 11 of the memory system 1 according to the second embodiment will be described with reference to FIG. 9.

In an example illustrated in FIG. 9, the logical cluster with the logical address 201 is entered in two portions (d1 and d2) in the physical cluster with the physical address 101. In a normal validity/invalidity determination rule, the logical cluster (d1) with the first logical address 201 is likely to be erroneously determined as a valid cluster despite being overwritten (user log 302: (A)). (A) indicates the user log 302 when a cluster validity/invalidity determination scheme of the memory system 1 according to the second embodiment is not applied. In the logical cluster with the address 202, data written in the physical cluster with the physical address 101 is also overwritten in the physical cluster with the physical address 102. However, since this updating involves updating of the logical-to-physical address conversion table, there is no possibility of the erroneous determination.

On the other hand, the controller 11 of the memory system 1 according to the second embodiment determines whether there is the same logical address in the range of the same physical address as each entry in the entry of the log cluster before the log cluster is written in the NAND memory 13. When entries with the same logical address are found on the rear side, the entry is invalidated (d1'). For example, the controller 11 invalidates an entry by writing a specific value such as an invalid value (NULL) in a region where the logical address is stored.

In this way, as illustrated in FIG. 9, an entry corresponding to the first logical address 201 in the physical address 101 on the log cluster is invalidated (user log 203: (B)). Since the entry in which the same logical address is repeated in the same physical address disappears, erroneous determination can be prevented in the memory system 1 according to the second embodiment. (B) indicates the user log 302 when the cluster validity/invalidity determination scheme of the memory system 1 according to the second embodiment is applied.

Figure 10:
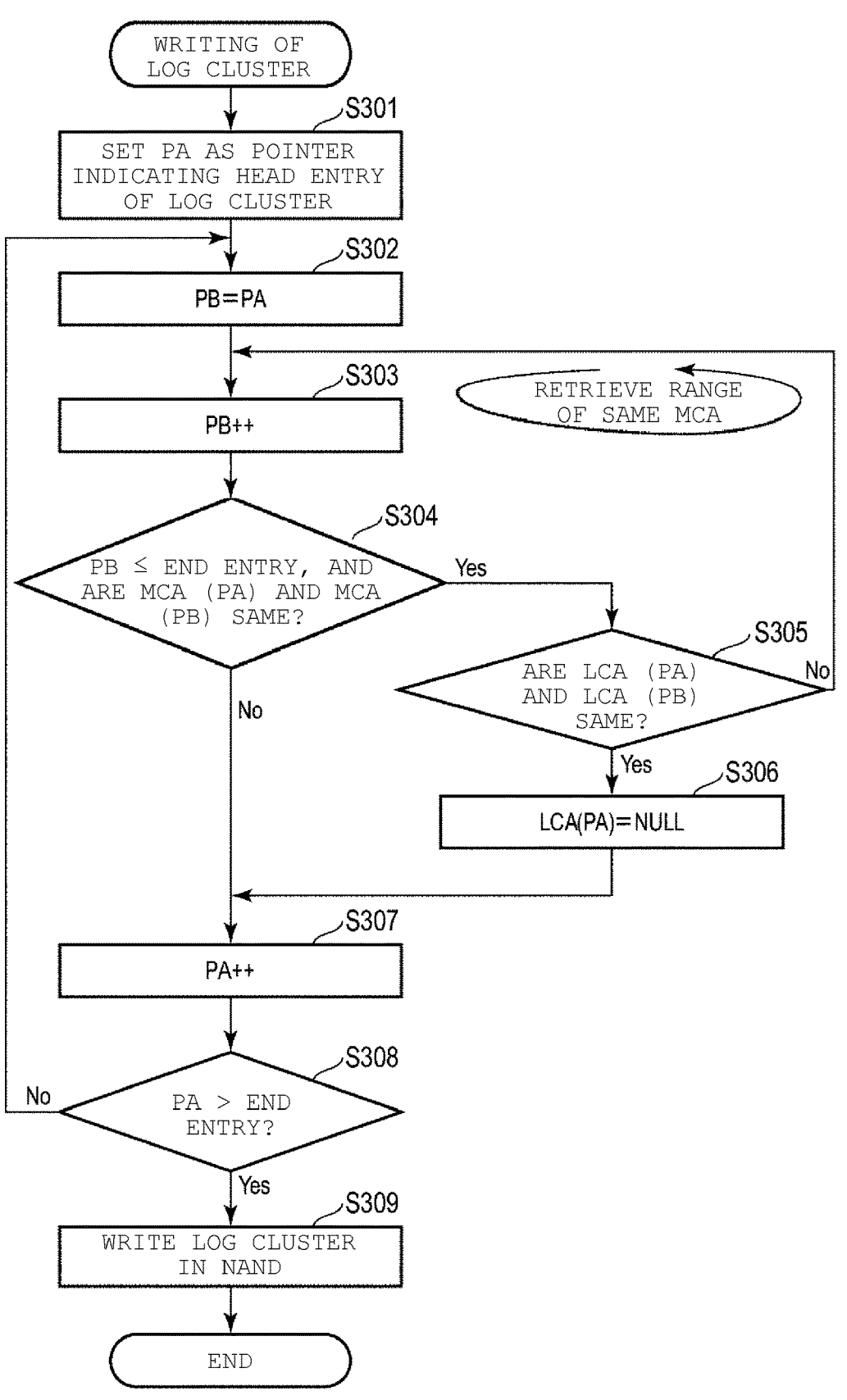
FIG. 10 is a flowchart illustrating writing of a log cluster in the memory system according to the second embodiment.

FIG. 10 illustrates an example of a flowchart of writing of a log cluster in the memory system 1 according to the second embodiment. Here, an example in which two pointers PA and PB indicating entries of the log cluster (user log) are used to determine whether there is the same logical address in the range of the same physical address will be described.

The controller 11 first sets PA as a pointer indicating a head entry of the log cluster (S301).

The controller 11 matches PB with PA (S302) and, moreover, increases PB by one (S303). Accordingly, immediately after the operation is started, PA indicates the head entry of the log cluster and PB indicates the second entry of the log cluster.

The controller 11 determines whether PB does not exceed the end entry of the log cluster and a physical address of the entry indicated by PA is the same as a physical address of the entry indicated by PB (S304). When PB does not exceed the end entry of the log cluster and the physical address of the entry indicated by PA is the same as the physical address of the entry indicated by PB (Yes in S304), the controller 11 determines, in turn, whether a logical address of the entry indicated by PA is the same as a logical address of the entry indicated by PB (S305).

When the logical address of the entry indicated by PA is not the same as the logical address of the entry indicated by PB (No in S305), the process returns to S303, increases PB by one, and the controller 11 repeats the determination of S304 or the determination of S305.

When the logical address of the entry indicated by PA is the same as the logical address of the entry indicated by PB (Yes in S305), the controller 11 invalidates the logical address of the entry indicated by PA (S306). When the controller 11 invalidates the logical address of the entry indicated by PA, the controller 11 increases PA by one (S307) and determines whether PA exceeds the end entry of the log cluster (S308). When PA does not exceed the end entry of the log cluster (No in S308), the process returns to S302 and the controller 11 matches PB with PA (S302), increases PB by one (S303), and repeats the determination of S304 or the determination of S305.

When PB exceeds the end entry of the log cluster or the physical address of the entry indicated by PA is not the same as the physical address of the entry indicated by PB (No in S304), the process proceeds to S307 and PA is increased by one. Then, the controller 11 determines whether PA exceeds the end entry of the log cluster (S308). When PA does not exceed the end entry of the log cluster (No in S308), the process returns to S302 and the controller 11 matches PB with PA (S302), increases PB by one, and repeats the determination of S304 or the determination of S305.

For example, when there is no same logical address in the range of a certain physical address, the determination of S305 is not Yes while the entry in the range of the physical address is indicated by PA. When the number of same logical addresses in the range of a certain physical address is three and an entry of the first logical address is indicated by PA, an entry of the second logical address is indicated by PB, the determination of S305 is Yes and the first logical address is first invalidated. Subsequently, when the entry of the second logical address is indicated by PA and an entry of the third logical address is indicated by PB, the determination of S305 is Yes and the second logical address is invalidated. As a result, only the third logical address remains to be valid.

When PA exceeds the end entry of the log cluster in the increase of S307 (Yes in S308), the controller 11 writes the log cluster in the NAND memory 13 (S309). In this way, in the memory system 1 according to the second embodiment, when the user log is written in the NAND memory 13, it is determined whether there are entries of the same logical address within the range of the same physical address. When there are the entries, the entries other than the rearmost entry of the user log are invalidated.

In the memory system according to the second embodiment, the controller 11 invalidates the entries other than the rearmost entry when the user log is written in the NAND memory 13 and there are the entries of the same logical address within the range of the same physical address. Thus, it is possible to prevent erroneous determination in the cluster validity/invalidity determination.

Accordingly, in the memory system 1 according to the second embodiment, it is possible to prevent data of an access target logical cluster from being determined to be erroneously located at a certain position in the physical cluster, and thus it is possible to improve I/O performance.

Third Embodiment

Next, a third embodiment will be described. In description of the third embodiment, a memory system that has the same configuration as the configuration of the first and second embodiments will be described as an example, and the same reference numerals are used for the same elements. In the memory system according to the third embodiment, for example, the controller 11 determines that entries other than the rearmost entry are invalid clusters when there are entries of the same logical address within a range of the same physical address in a cluster validity/invalidity determination process in garbage collection, and thus prevents erroneous determination in the cluster validity/invalidity determination.

An operation in which the controller 11 of the memory system 1 according to the third embodiment prevents erroneous determination in cluster validity/invalidity determination in garbage collection will be described with reference to FIG. 11.

Figure 11:
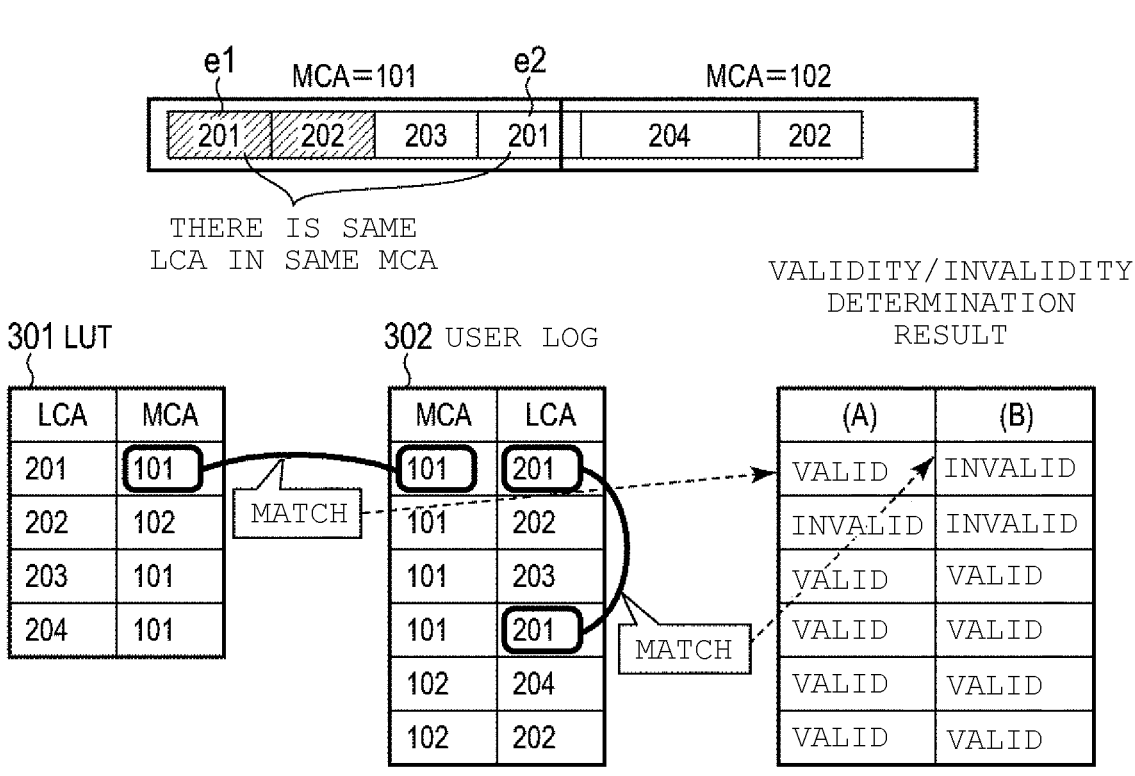
FIG. 11 is a diagram illustrating an operation of preventing erroneous determination in cluster validity/invalidity determination of garbage collection by a memory system according to a third embodiment.

In an example illustrated in FIG. 11, the logical cluster with the logical address 201 is entered in two portions (e1 and e2) in the physical cluster with the physical address 101. In a normal validity/invalidity determination rule, the logical cluster (e1) with the first logical address 201 is likely to be erroneously determined as a valid cluster despite being overwritten (validity/invalidity determination result (A)). (A) indicates the validity/invalidity determination result when a cluster validity/invalidity determination scheme of the memory system 1 according to the third embodiment is not applied.

When the controller 11 of the memory system 1 according to the third embodiment reads a log cluster from the NAND memory 13 and executes validity/invalidity determination of the cluster in the garbage collection, the controller 11 determines whether there is the same logical address in the range of the same physical address as each entry in the entry of the physical address (MCA) of the user log 302. When entries with the same logical address are found, the controller 11 determines that data corresponding to the entries other than the rearmost (e.g., newest) entry among the entries of the same logical address is invalid (a validity/invalidity determination result (B)) and excludes the data from a garbage collection transfer target. The data excluded from the garbage collection transfer target is not stored in another block and is erased as a result of erasing of the block where the data is stored. Through this erasing, the data can be prevented afterward from being erroneously read. (B) indicates the validity/invalidity determination result when the cluster validity/invalidity determination scheme of the memory system 1 according to the third embodiment is applied.

In this way, in the memory system 1 according to the third embodiment, it is possible to prevent erroneous determination in cluster validity/invalidity determination as in the second embodiment.

Figure 12:
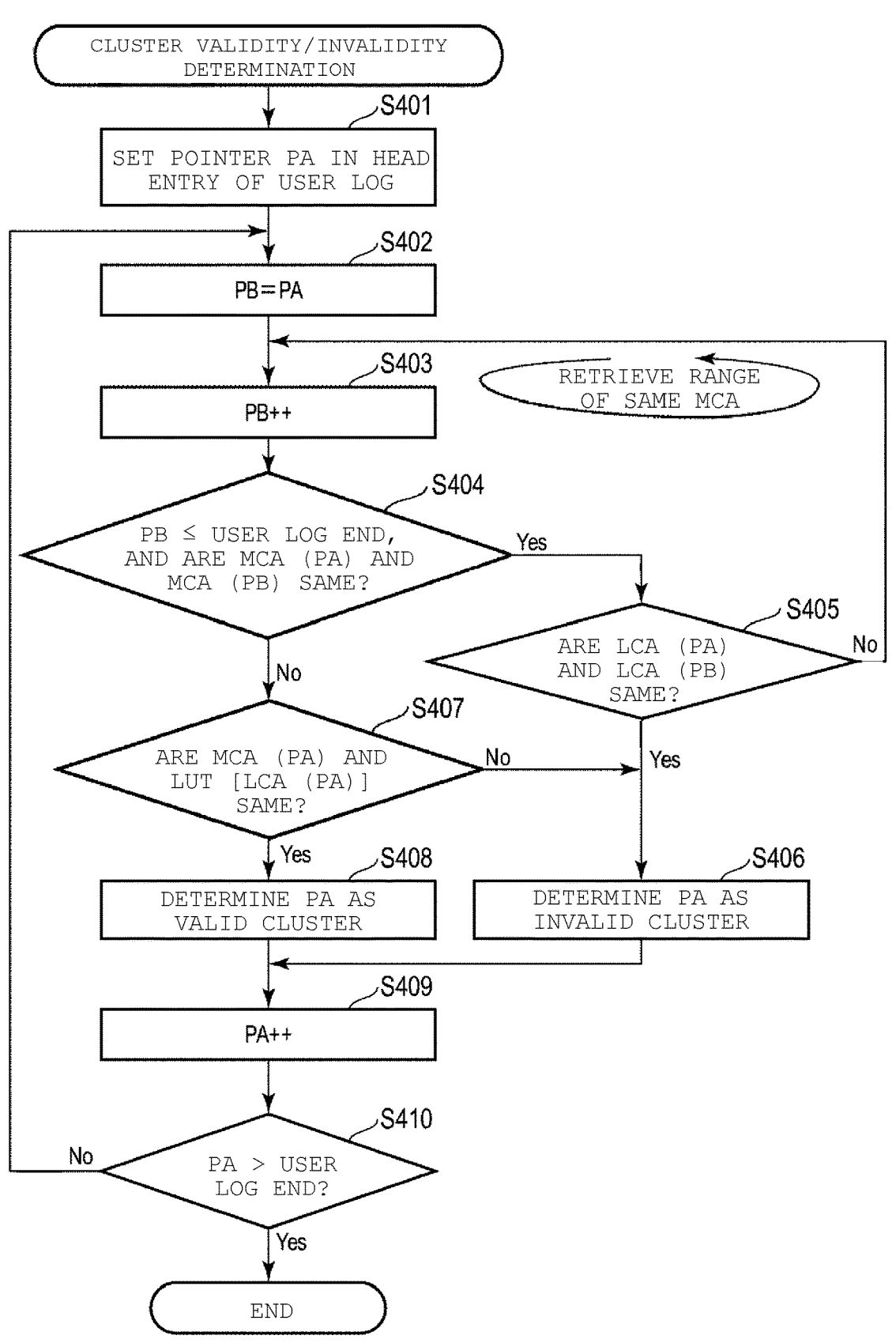
FIG. 12 is a flowchart illustrating cluster validity/invalidity determination in the memory system according to the third embodiment.

FIG. 12 illustrates an example of a flowchart of cluster validity/invalidity determination in the memory system 1 according to the third embodiment. Here, an example in which two pointers PA and PB indicating entries of the user log are used to determine whether there is the same logical address within the range of the same physical address will be also described.

The controller 11 first sets the pointer PA in a head entry of the user log (S401).

The controller 11 matches PB with PA (S402) and, moreover, increases PB by one (S403).

The controller 11 determines whether PB does not exceed the end entry of the user log and a physical address of the entry indicated by PA is the same as a physical address of the entry indicated by PB (S404). When PB does not exceed the end entry of the user log and the physical address of the entry indicated by PA is the same as a physical address of the entry indicated by PB (Yes in S404), the controller 11 determines, in turn, whether a logical address of the entry indicated by PA is the same as a logical address of the entry indicated by PB (S405).

When the logical address of the entry indicated by PA is not the same as the logical address of the entry indicated by PB (No in S405), the process returns to S403, and the controller 11 increases PB by one and repeats the determination of S404 or the determination of S405.

When the logical address of the entry indicated by PA is the same as the logical address of the entry indicated by PB (Yes in S405), the controller 11 determines that the logical cluster indicated by the logical address of the entry indicated by PA is an invalid cluster (S406).

When PB exceeds the end entry of the user log or the physical address of the entry indicated by PA is not the same as the physical address of the entry indicated by PB (No in S404), the controller 11 determines whether the physical address of the entry indicated by PA is the same as a physical address of the entry of the logical-to-physical address conversion table indicated by a logical address of the entry indicated by PA (S407).

When the physical address of the entry indicated by PA is not the same as the physical address of the entry of the logical-to-physical address conversion table (No in S407), the controller 11 determines that the logical cluster indicated by the logical address of the entry indicated by PA is an invalid cluster (S406). When the physical address of the entry indicated by PA is the same as the physical address of the entry of the logical-to-physical address conversion table (Yes in S407), the controller 11 determines that the logical cluster indicated by the logical address of the entry indicated by PA is a valid cluster (S408). When the controller 11 determines the logical cluster indicated by the logical address of the entry indicated by PA is valid or invalid, the controller 11 increases PB by one (S409) and determines whether PA exceeds the end entry of the user log (S410). When PA does not exceed the end entry (No in S410), the process returns to S402, and the controller 11 matches PB with PA (S402), increases PB by one (S403), and repeats the determination of S404 or determination of S405, or the determination of S407.

When PA exceeds the end entry of the user log in the increase of S409 (Yes in S410), the controller 11 ends the cluster validity/invalidity determination process.

In this way, in the memory system 1 according to the third embodiment, it is determined in the cluster validity/invalidity determination in the garbage collection whether there are entries of the same logical address within the range of the same physical address. When there are the entries, the entries other than the rearmost entry are invalidated.

Accordingly, in the memory system 1 according to the third embodiment, it is possible to prevent data of an access target logical cluster from being erroneously determined to be located at a certain position in the physical cluster, and thus it is possible to improve I/O performance.

Fourth Embodiment

Next, a fourth embodiment will be described. In description of the fourth embodiment, a memory system that has the same configuration as the configuration of the first to third embodiments will be described as an example, and the same reference numerals are used for the same elements.

In the memory system according to the fourth embodiment, for example, when a table that is stored in a header during writing of an ECC frame and indicates correspondence between a logical address and an offset is generated and there are a plurality of entries of the same logical address in the same ECC frame, the controller 11 invalidates entries other than the rearmost entry, and thus erroneous selection of a position to be read in the ECC frame during reading of a cluster is prevented.

An operation during writing of an ECC frame in the controller 11 of the memory system 1 according to the fourth embodiment will be described with reference to FIG. 13.

Figure 13:
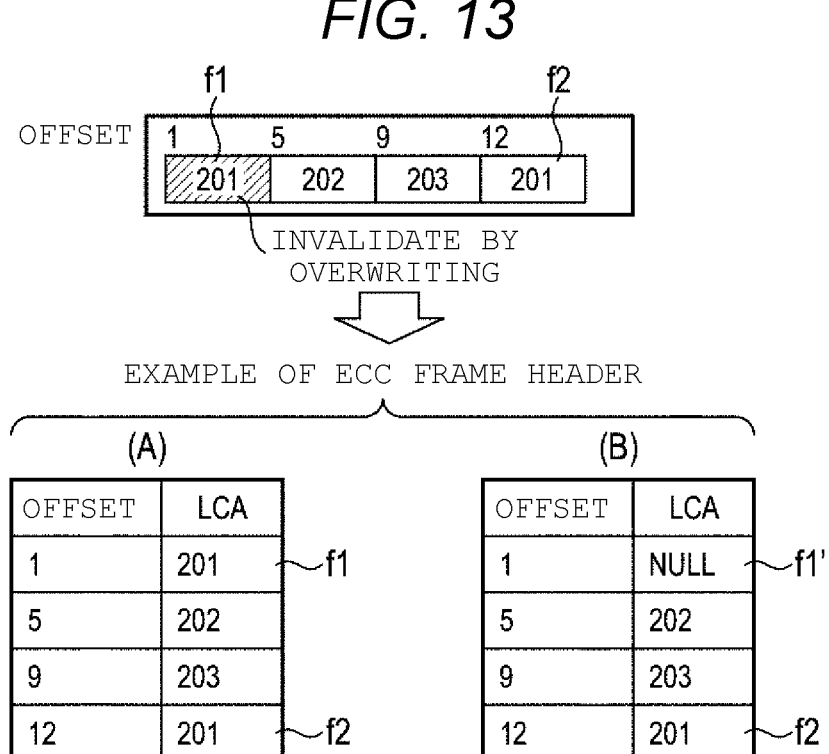
FIG. 13 is a diagram illustrating an operation during writing of an ECC frame in a memory system according to a fourth embodiment.

In an example illustrated in FIG. 13, when the logical cluster of the logical address 201 is entered in two portions (f1 and f2) in a physical cluster (ECC frame) of the same physical address and the table indicating the correspondence between the logical address and the offset is generated, the resulting table includes the entries of the logical address 201 in two portions.

When the ECC frame is written in the NAND memory 13 without change and a cluster of the logical address 201 is read, there are two corresponding offsets of 1 and 12 in the header (an example (A) of an ECC frame header). If the offset of 1 is selected, overwritten data may be read, which leads to an erroneous operation. (A) is an example of a header when an entry invalidation scheme of the memory system 1 according to the fourth embodiment is not applied.

The controller 11 of the memory system 1 according to the fourth embodiment collects a plurality of clusters (after compression) to be written to generate an ECC frame. When the table indicating the correspondence between the offset and the logical address in the header is generated before writing in the NAND memory 13 and there are a plurality of entries having the same logical address, the entries other than the finally written entry are invalidated (an example (B) of the ECC frame header). (B) is an example of a header when an entry invalidation scheme of the memory system 1 according to the fourth embodiment is applied.

In this way, the memory system 1 according to the fourth embodiment can cancel the repetition of the logical address of the same table and prevent erroneous selection of the offset.

17

18

Figure 14:
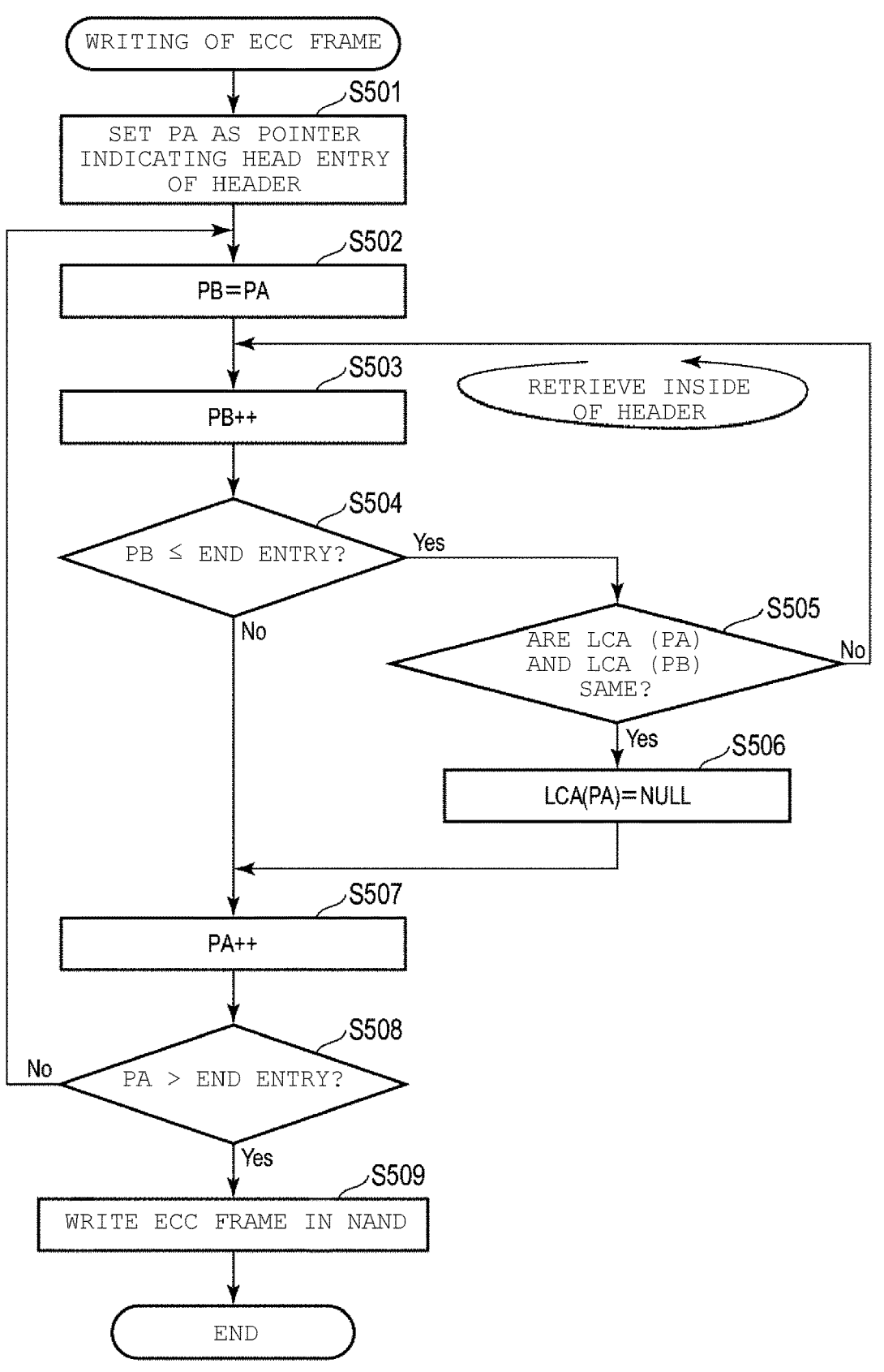
FIG. 14 is a flowchart illustrating writing of the ECC frame in the memory system according to the fourth embodiment.

FIG. 14 is an example of a flowchart illustrating writing of the ECC frame in the memory system 1 according to the fourth embodiment.

Here, an example in which two pointers PA and PB indicating entries of the table are used to determine whether there is the same logical address within the range of the same physical address will be also described.

The controller 11 first sets PA as a pointer indicating a head entry of the header (S501).

The controller 11 matches PB with PA (S502) and, moreover, increases PB by one (S503).

The controller 11 determines whether PB does not exceed the end entry of the header (S504). When PB does not exceed the end entry of the header (Yes in S504), the controller 11 determines whether a logical address of the entry indicated by PA is the same as a logical address of the entry indicated by PB (S505).

When the logical address of the entry indicated by PA is not the same as the logical address of the entry indicated by PB (No in S505), the process returns to S503, and the controller 11 increases PB by one and repeats the determination of S504 or the determination of S505.

When the logical address of the entry indicated by PA is the same as the logical address of the entry indicated by PB (Yes in S505), the controller 11 invalidates the offset of the entry indicated by PA (S506). When the controller 11 invalidates the offset of the entry indicated by PA, the controller 11 increases PA by one (S507) and determines whether PA exceeds the end entry of the header (S508). When PA does not exceed the end entry of the header (No in S508), the process returns to S502 and the controller 11 matches PB with PA (S502), increases PB by one (S503), and repeats the determination of S504 or the determination of S505.

When PB exceeds the end entry of the header (No in S504), the process moves to S507 and PA is increased by one. Then, the controller 11 determines whether PA exceeds the end entry of the header (S508). When PA does not exceed the end entry of the header (No in S508), the process returns to S502 and the controller 11 matches PB with PA (S502), increases PB by one, and repeats the determination of S504 or the determination of S505.

When PA exceeds the end entry of the header in the increase of S507 (Yes in S508), the controller 11 writes the ECC frame in the NAND memory 13 (S509).

In this way, in the memory system 1 according to the fourth embodiment, when the ECC frame is written in the NAND memory 13, it is determined whether there are a plurality of entries of the same logical address within the same ECC frame. When there are the entries, the entries other than the rearmost entry are invalidated.

Accordingly, in the memory system 1 according to the fourth embodiment, it is possible to prevent data from being erroneously read when a read target logical cluster is read, and thus it is possible to improve I/O performance.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a nonvolatile memory; and
a controller configured to:
   maintain an address mapping table including first mapping information indicating correspondence between logical addresses and physical addresses of the nonvolatile memory in units of physical regions each having a predetermined size; and
   perform a write operation in response to a write command, wherein the controller, during the write operation:
      compresses write data of the predetermined size corresponding to the write command into a compressed write data;
      determines a physical address range of the nonvolatile memory in which the compressed write data is to be written;
      writes the compressed write data into the physical address range of the nonvolatile memory and also second mapping information into an area in one or more physical regions spanned by the physical address range, the second mapping information including a first entry that indicates a logical address of the write data, an information capable of specifying an offset, and a size of the compressed write data, the offset indicating a starting point of the physical address range from which the compressed write data is written; and
      updates the address mapping table, such that the first mapping information corresponding to the write data indicates that the logical address of the write data is mapped to one of the one or more physical regions.

2. The memory system according to claim 1, wherein when the physical address range in which the compressed write data is written spans a plurality of physical regions, the first mapping information corresponding to the write data also indicates a number of physical regions spanned by the physical address range.

3. The memory system according to claim 1, wherein the controller is configured to perform a read operation to read the compressed data, wherein the controller, during the read operation, reads entirety of data stored in the one more physical regions spanned by the physical address range.

4. The memory system according to claim 1, wherein the address mapping table includes no information about the offset and the size of the compressed write data.

5. The memory system according to claim 1, wherein the controller is further configured to:
   determine a block of the nonvolatile memory to be a target block to be subjected to a garbage collection, the block corresponding to a group of physical regions; and
   perform the garbage collection with respect to the target block,
   wherein the controller determines the target block in accordance with an evaluation value, which is obtained with a number of physical regions in a block in which valid data is stored divided by an average compression ratio of data stored in the block.

6. The memory system according to claim 5, wherein the controller determines a block of the nonvolatile memory that has a minimum evaluation value to be the target block to be subjected to the garbage collection.

7. The memory system according to claim 5, wherein the controller is further configured to:
   maintain the average compression ratio for each of a plurality of blocks of the nonvolatile memory; and at a predetermined timing, determine a second target block for which the average compression ratio is to be updated and calculate the average compression ratio of data stored in the second target block.

8. The memory system according to claim 7, wherein the predetermined timing is during the garbage collection.

9. The memory system according to claim 7, wherein the predetermined timing is when the controller detects a block in which invalid data increased by more than a predetermined amount from a last update of the average compression ratio.

10. The memory system according to claim 7, wherein the controller determines a block of the nonvolatile memory for which the average compression ratio has not been updated for a longest period of time, to be the second target block.

11. The memory system according to claim 7, wherein the controller determines a block of the nonvolatile memory having a largest amount of increase in invalid data from a last update of the average compression ratio, to be the second target block.

12. The memory system according to claim 1, wherein the controller is further configured to:

maintain a log indicating a write history with respect to each of a plurality of blocks of the nonvolatile memory, each of the blocks corresponding to a group of physical regions, the log including one or more entries, which indicate chronologically logical address of compressed data which has been written.

13. The memory system according to claim 12, wherein the controller is further configured to:

when overwrite data of the compressed write data is written in a same physical region in which the compressed write data has been written, invalidate an entry of the log corresponding to the compressed write data.

14. The memory system according to claim 13, wherein the controller is configured to update the logical address in the entry of the log corresponding to the compressed write data to an invalid value, to invalidate the entry of the log.

15. The memory system according to claim 12, wherein the controller is further configured to:

determine a block of the nonvolatile memory to be a target block to be subjected to a garbage collection; and perform a garbage collection with respect to the target block, wherein the controller, during the garbage collection, searches the log corresponding to the target block for multiple entries that indicate correspondence between the same physical address and the same logical address and determines data corresponding to one or more of the multiple entries except for a newest one thereof to be invalid.

16. The memory system according to claim 1, wherein the controller is further configured to:

retrieve whether there are a plurality of entries, which include the same logical address, in the second mapping information; and invalidate one or more entries other than a chronologically final entry among the plurality of entries when there are the plurality of entries.

17. The memory system according to claim 1, wherein the controller is further configured to:

when overwrite data of the compressed write data is written in a same physical region in which the compressed write data has been written, update the second mapping information in the area in the one or more physical regions spanned by the physical address range, said update of the second mapping information includes:

adding a second entry that indicates a logical address of the overwrite data and an offset indicating a starting point of the physical address range from which the overwrite data is written; and invalidating the first entry.

18. The memory system according to claim 16, wherein the controller is configured to update the logical address in the first entry to an invalid value, to invalidate the first entry.

19. A method for controlling a memory system including a nonvolatile memory, the method comprising:

maintaining an address mapping table including first mapping information indicating correspondence between logical addresses and physical addresses of the nonvolatile memory in units of physical regions each having a predetermined size; and performing a write operation in response to a write command, wherein the write operation includes:

compressing write data of the predetermined size corresponding to the write command into a compressed write data;

determining a physical address range of the nonvolatile memory in which the compressed write data is to be written;

writing the compressed write data into the physical address range of the nonvolatile memory and also second mapping information into an area in one or more physical regions spanned by the physical address range, the second mapping information including a first entry that indicates a logical address of the write data, an information capable of specifying an offset, and a size of the compressed write data, the offset indicating a starting point of the physical address range from which the compressed write data is written; and updating the address mapping table, such that the first mapping information corresponding to the write data indicates that the logical address of the write data is mapped to one of the one or more physical regions.

20. The method according to claim 19, wherein when the physical address range in which the compressed write data is written spans a plurality of physical regions, the first mapping information corresponding to the write data also indicates a number of physical regions spanned by the physical address range.

* * * * *